United States Patent
Hahn et al.

(10) Patent No.: US 10,486,759 B2
(45) Date of Patent: Nov. 26, 2019

(54) METHOD FOR CONVEYING AT LEAST ONE VEHICLE COMPONENT TO A VEHICLE BODY WITH AT LEAST ONE ROBOT DEVICE IN AN ASSEMBLY STATION AND ASSEMBLY STATION HAVING THE ROBOT DEVICE

(71) Applicant: GM GLOBAL TECHNOLOGY OPERATIONS LLC, Detroit, MI (US)

(72) Inventors: Sascha Hahn, Ruesselsheim (DE); Uwe Hüttenmüller, Ruesselsheim (DE); Uwe Leers, Ruesselsheim (DE); Steve Geinitz, Ruesselsheim (DE); Manuela Patz, Ruesselsheim (DE); Dirk Klee, Ruesselsheim (DE); Steffen Lehmann, Ruesselsheim (DE); Norbert Possner, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 255 days.

(21) Appl. No.: 15/610,121

(22) Filed: May 31, 2017

(65) Prior Publication Data
US 2017/0349228 A1 Dec. 7, 2017

(30) Foreign Application Priority Data
Jun. 1, 2016 (DE) .......... 10 2016 006 581

(51) Int. Cl.
| | |
|---|---|
| *B23Q 15/00* | (2006.01) |
| *B23P 19/00* | (2006.01) |
| *B62D 65/06* | (2006.01) |
| *B65G 43/10* | (2006.01) |
| *B62D 65/18* | (2006.01) |

(52) U.S. Cl.
CPC ............ *B62D 65/18* (2013.01); *B62D 65/06* (2013.01)

(58) Field of Classification Search
CPC .......... B62D 65/18; B62D 65/06; B60J 10/45
See application file for complete search history.

(56) References Cited

U.S. PATENT DOCUMENTS

| | | | | |
|---|---|---|---|---|
| 4,589,184 A * | 5/1986 | Asano | ............ | B25J 9/0093 |
| | | | | 198/575 |
| 5,019,762 A * | 5/1991 | Kato | ............ | B25J 15/0491 |
| | | | | 318/568.2 |
| 6,899,377 B2 * | 5/2005 | Ghuman | ............ | B23P 21/004 |
| | | | | 29/429 |
| 2004/0056498 A1 * | 3/2004 | Ghuman | ............ | B23P 21/004 |
| | | | | 296/1.01 |

FOREIGN PATENT DOCUMENTS

DE 202010015845 A1 2/2011

* cited by examiner

*Primary Examiner* — Ryan J. Walters
*Assistant Examiner* — Lawrence Averick
(74) *Attorney, Agent, or Firm* — Lorenz & Kopf, LLP

(57) ABSTRACT

A method is disclosed for conveying a vehicle component to a vehicle body with a robot device in an assembly station. The assembly station includes a provisioning position in which the vehicle component is provisioned for conveying to the vehicle body. The assembly station further includes a final assembly location at which the vehicle component is final-assembled on the vehicle body. The robot device grips the vehicle component in the provisioning position and conveys the vehicle component to the final assembly location.

7 Claims, 3 Drawing Sheets

METHOD FOR CONVEYING AT LEAST ONE VEHICLE COMPONENT TO A VEHICLE BODY WITH AT LEAST ONE ROBOT DEVICE IN AN ASSEMBLY STATION AND ASSEMBLY STATION HAVING THE ROBOT DEVICE

CROSS-REFERENCE TO RELATED APPLICATION

This application claims priority to German Patent Application No. 102016006581.8, filed Jun. 1, 2016, which is incorporated herein by reference in its entirety.

TECHNICAL FIELD

The present disclosure pertains to a vehicle assembly process, and particularly to a method for conveying a vehicle component to a vehicle body with a robot device in an assembly station.

BACKGROUND AND SUMMARY

Vehicle doors are assembled on a vehicle body during the production of vehicles. Often, conveyors are utilized for this purpose to convey the vehicle doors into the assembly station ready for assembly there. Often, a worker transports the vehicle doors with a transport trolley to the vehicle body and assembles the doors on the vehicle body with the help of a lifting device and a handling device. For example, DE 20 2010 015 845 U 1 describes a device for aligning a body part gripper which takes up a body part ready for assembling on a vehicle body. The device includes a handling device and a body part gripper which can adapt its alignment.

The present disclosure provides a simplified and cost-saving method for conveying at least one vehicle component to a vehicle body in an assembly station. In particular, a method is disclosed for conveying at least one vehicle component to a vehicle body with at least one robot device in an assembly station. The vehicle body may be a body of a motor car or utility vehicle. Optionally, the at least one vehicle component may be a vehicle door which is to be assembled on the vehicle body. The same can be configured as a front or rear vehicle door. The at least one robot device is preferably formed as at least one six-axis jointed-arm robot.

Preferably, the vehicle body is arranged on a conveyor moveable through the assembly station. It is feasible that the conveyor stops at the vehicle body for a final assembly of the at least one vehicle component. It is preferred, however, that the conveyor is steadily moved as part of flow production and the worker assembles the vehicle component on the vehicle body while the same is being transported through the assembly station.

The assembly station includes a provisioning position, in which the vehicle component is provided for further conveying and for the final assembly on the vehicle body subsequently. Preferably, the provisioning position is arranged in the assembly station spaced from the vehicle body.

The assembly station includes at least one final assembly location, at which the vehicle component is final-assembled on the vehicle body, preferably by the worker. In particular, the final assembly location is arranged adjacent to and/or adjoining the vehicle body and/or the conveyor.

The robot device is preferably arranged between the provisioning position and the final assembly location and is configured to grip the vehicle component at the provisioning location and transport same to the final assembly location. For this purpose, the robot device is preferably moveable about six axes and can grip and convey a load of up to 160 kg, preferably of up to 180 kg. For example, the robot device includes at least one suction cup as gripping tool. In the event that the vehicle component is formed as the vehicle door, the robot device grips same by a windowpane integrated in the vehicle door using the at least one suction cup.

It is generally known that conveying vehicle doors to a vehicle body in an assembly station is performed by workers in order to assemble the same on the vehicle body. To this end, the workers use auxiliary transport devices, for example transport trolleys and lifting devices. In particular because of the size and the weight of the vehicle doors it is often difficult for the worker to pick up, convey and assemble the vehicle doors.

Usually, the vehicle doors are brought into the assembly station by a suspended conveyor spaced from a floor and subsequently lowered from vertical curves to a floor height. Generally, the vehicle doors are subsequently correctly positioned on a turntable and provisioned for a collection by the worker. Because of the heavy weight of the vehicle doors, the worker grips the vehicle doors with the help of the lifting device and transports the same to corresponding final assembly locations using the auxiliary transport device in order to final-assemble the vehicle doors on the vehicle body. It is known that the vehicle doors are lifted and aligned at the final assembly locations using handling and/or lifting devices, so that the worker can adjust and final-assemble the vehicle doors on the vehicle body.

It is advantageous that the workers are relieved by the present method. A physical continuous strain on the workers who have to handle the at least one vehicle component with the help of the lifting device and auxiliary transport devices can be avoided. Because of this, excessive strain, physical harm and illness of the workers resulting from this can be reduced.

It is advantageous, furthermore, that a number of the separate lifting devices and auxiliary transport devices can be reduced to a minimum. In particular, the conveying between the provisioning location and the final assembly location can be entirely carried out by the robot device. Because of this, the conveying of the vehicle component to the vehicle body can be significantly simplified. In particular, cycles in the assembly station can be reduced and costs thereby saved.

It is advantageous, furthermore, that the robot device during a model change of the vehicle body can be easily, quickly programmed in a cost-saving manner in accordance with the new body model. Elaborate adaptations of the handling and/or lifting devices through design conversion and mechanical changes can be advantageously omitted.

In a preferred implementation of the method, the assembly station is arranged on an assembly line on which the vehicle body is gradually completed to form a finished vehicle ready for driving. Preferably, a suspended conveyor device is assigned to the assembly station, which conveys the vehicle body spaced from the floor of the assembly station, in particular at a height of at least two meters, preferably at a height of at least three meters and/or at a height of maximally five meters into the assembly station. In particular, the vehicle component is transported to the provisioning position by the suspended conveyor device. Specifically, the suspended conveyor device defines the provisioning position in that it provisions the vehicle component synchronized accurately with the at least one robot device for the handover. In a preferred embodiment of the present disclosure, the provisioning position and the final assembly location are arranged at a height offset relative to one another. For example, the height offset amounts to at least one meter, preferably at least two meters, in particular at least three meters and/or maximally five meters. The height offset results in particular from the fact that the at least one final assembly location is arranged slightly above the floor height adjacent to the vehicle body and/or the conveyor.

A particularly preferred implementation of the method provides that the robot device bridges the height offset between the provisioning position and the final assembly location. Preferably, the robot device lowers the vehicle component from the provisioning position to the final assembly location. Because of this, the so-called vertical curve can be advantageously omitted, which usually fetches the vehicle component from the suspended conveyor down to floor height. In a preferred configuration of the method, the robot device aligns the vehicle component for the final assembly.

In particular, the robot device turns and/or pivots the vehicle component into a correct final assembly position. Because of this, a turntable can be advantageously replaced, on which the vehicle components can usually be turned into the final assembly position before the worker conveys it to the vehicle body. Optionally additionally, the robot device adjusts the vehicle component at the final assembly location so that the worker merely has to fine-adjust the same in order to perform the final assembly. The fine adjustment is performed by the worker preferably with the help of the at least one robot device at the final assembly location. Because of this, the use of handling and/or lifting devices can be advantageously omitted for the final assembly, in particular for the fine adjustment and costs and time thereby saved.

Within the scope of the method it is particularly preferred that at least one first and at least one second vehicle component are provisioned in the provisioning position. Because of this, a two-door motor car body can be provided with the relevant vehicle doors. For example, the first vehicle component may be a right vehicle door, which is final-assembled on a right side of the vehicle body and the second vehicle component may be a left vehicle door, which is final-assembled on a left side of the vehicle body. Furthermore it is preferred within the scope of the method that a first, second, third and fourth vehicle component, in particular vehicle door, are provisioned in the provisioning position. Because of this, in the case of a four-door motor vehicle body, all required vehicle doors can be final-assembled. In this case, the first and third vehicle components may be configured as right vehicle doors and the second and fourth vehicle component may be configured as left vehicle doors.

A preferred implementation of the method provides that the assembly station includes a first robot device and a second robot device. Optionally, the first robot device grips and transports the first vehicle component and the second robot device the second vehicle component. Preferably the assembly station includes a first, second, third and fourth robot devices for the respective gripping and conveying of the first, second, third and fourth vehicle component. It is also possible within the scope of the method that the first robot device consecutively grips and conveys the first and third vehicle components to the corresponding final assembly location and the second robot device consecutively grips and conveys the second and fourth vehicle components to the corresponding final assembly locations.

Optionally, the assembly station includes a first final assembly location and a second final assembly location. Preferably, the first robot device transports the first vehicle component from the provisioning position to the first final assembly location. In particular, the second robot device transports the second vehicle component from the provisioning position to the second final assembly location. For example, the first final assembly location is arranged on a right side of the vehicle body and the second final assembly location on a left side of the vehicle body. Because of this, at least one right vehicle door can be final-assembled on the right side of the vehicle body and at least one left vehicle door on the left side of the vehicle body. It is also possible within the scope of the method that the assembly station includes four final assembly locations at which in each case one of a total of four vehicle components is final-assembled. In this case, two of the four final assembly locations are arranged on the right side of the vehicle body and the other two final assembly locations on the left side of the vehicle body.

In a preferred configuration of the present disclosure, the method, for the event of a defect of the at least one second robot device, includes a backup method. Within the scope of the backup method, the gripping of the at least one second vehicle component from the provisioning position and the conveying to the second final assembly location in the case of a defective second robot device are described.

Preferably, the backup method is carried out in a backup assembly station. Optionally, the backup assembly station includes a handover location, at which the second vehicle component is handed over to the worker. For example, the handover location is arranged between the provisioning position and the first final assembly location. Preferably, the handover location is arranged slightly above the floor height so that the worker can handle the second vehicle component.

It is possible, within the scope of the method, that the handover location is designed as a turntable. Preferably, the second vehicle component is adjusted on the turntable and/or rotated by 180 degrees in order to transpose it into the correct assembly position.

Within the scope of the method it is particularly preferred that the first robot device upon the defect of the second robot device is switched over from a standard operating mode to a backup operating mode. Because of this it is achieved that the first robot device operates according to the backup method.

Within the scope of the backup method, the one first robot device in backup operating mode grips the first vehicle component in the provisioning position and transports the same to the first final assembly location. Optionally additionally, the first robot device in backup operating mode grips the second vehicle component in the provisioning position and conveys the same to the handover location. In particular, the first robot device in the backup operating mode assumes in part the task and/or function of the defective second robot device. Since the first robot device cannot bridge the entire distance to the second final assembly location, the second vehicle component is conveyed to the handover location and further transported there by the worker to the second final assembly location.

It is preferred, within the scope of the method, that the robot device offsets a further height offset which is arranged between the provisioning position and the handover location. In particular, the robot device lowers the second body component from the provisioning position by the further height offset. It is also possible that the first robot device adjusts and/or rotates the second vehicle component for the final assembly and thus puts the same down at the handover location in a position that is correct for the final assembly. In this case, designing the handover location as a turntable can be omitted.

In a preferred embodiment of the present disclosure, the backup assembly station includes at least one auxiliary device with which the worker can accept the second vehicle component and transport the same to the second final assembly location.

Preferably, the auxiliary device is designed as a lifting device for lifting the second vehicle component, as a transport device for transporting the second vehicle component from the handover location to the second final assembly location and/or as a handling device for handling and/or adjusting the one second vehicle component at the second final assembly location. In particular, the worker lifts the second vehicle component using the lifting device and arranges it on the transport device. With the latter, the worker transports the second vehicle component to the second final assembly location. There, the worker using the handling device lifts the second vehicle component and adjusts the same on the vehicle body in order to be able to carry out the final assembly.

A further subject of the present disclosure is formed by an assembly station with at least one robot device for carrying out the method according to the various embodiments described above. Preferably, the robot device can be switched over to the backup operating mode. In particular, the robot device includes at least two operating modes in which the robot device can be operated. Specifically, the robot device can be programmed for two operating modes. In particular, a first operating mode is a standard conveying mode and a second operating mode is a backup operating mode. When the robot device is operated according to the present disclosure, it preferably includes a standard operating mode. In the event of a defect of a second robot device, the first robot device includes the backup operating mode.

Preferably, the backup method with the first robot device in the backup operating mode is preferably conducted in the assembly station in the backup assembly station. In particular, the assembly station includes the backup assembly station that is configured as the backup assembly station and/or can be converted to the backup assembly station. Specifically, the backup assembly station includes at least one auxiliary device. Optionally, the assembly station includes the vehicle component and/or the suspension conveyor device.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
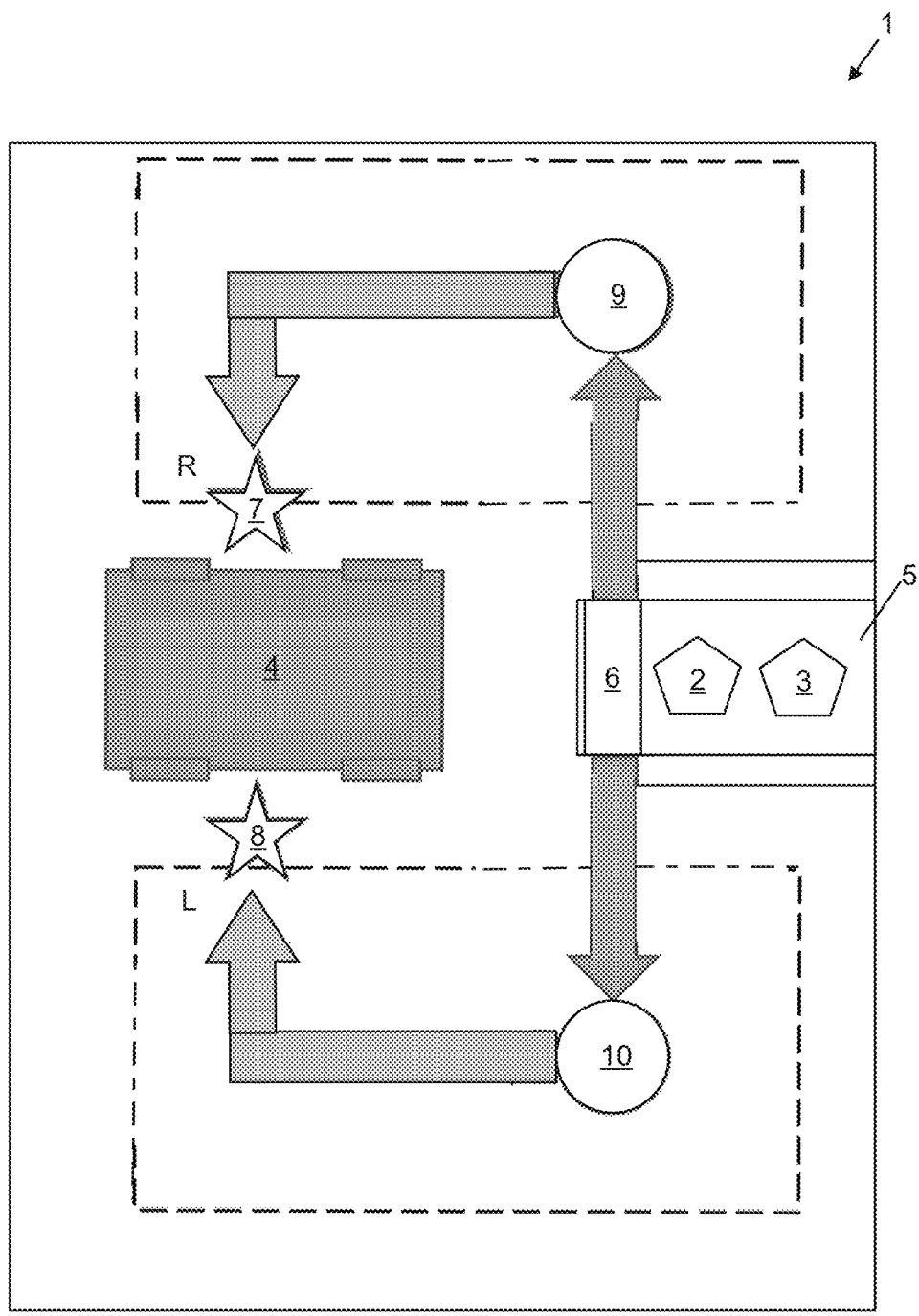
FIG. 1 is a schematic top view of an assembly station with a first robot device gripping a first vehicle component and second robot device gripping a second vehicle component.

FIG. 1 shows a top view from above onto an assembly station 1. A first robot device 9 grips a first vehicle component 2 in a provisioning position 6 and conveys the first vehicle component 2 to a first final assembly 7 location on a vehicle body 4. A second robot device 10 grips a second vehicle component 3 in the provisioning position 6 and conveys the second vehicle component 3 to a second final assembly 8 location on the vehicle body 4.

In the assembly station 1, a first vehicle component 2 and a second vehicle component 3 are conveyed to a vehicle body 4 for final assembling it there on the vehicle body 4. The vehicle body 4 is arranged on a conveyor 11 on which it is moveable through the assembly station 1 at floor height, which stands for example up to one meter above a floor of the assembly station and/or on which a worker stands during the final assembly of the vehicle doors 2, 3. The final assembly of the first and second vehicle component 2, 3 takes place within the scope of a flow production in the assembly station 1. During the flow production, the vehicle body 4 is steadily moved on the conveyor 11 and the final assembly performed in motion. Alternatively, the conveyor 11 can also briefly stop for the final assembly or reduce a moving speed and restart or again increase the moving speed following the final assembly.

The first and second vehicle component 2, 3 is formed as a right and left vehicle door 2, 3. The right vehicle door 2 is final-assembled on a right side R of the vehicle body 4 and the left vehicle door 3 on a left side L of the vehicle body 4. The right and left vehicle doors 2, 3 are transported into the assembly station 1 via a suspended conveyor 5, which is arranged at a height of at least two meters preferably at a height of at least three meters and/or maximally five meters above the floor.

The assembly station 1 includes a provisioning position 6 which is defined by the suspended conveyor 5. Thus, the provisioning position 6 is arranged at the height of the suspended conveyor 5. In particular, the suspended conveyor 5 provisions the first and second vehicle door 2, 3 for transport to the vehicle body 4 in the provisioning position 6.

The assembly station 1 includes a first and second final assembly location 7, 8 which are arranged adjacent to the vehicle body 4 and/or to the conveyor 11. The first final assembly location 7 is arranged on the right side R of the vehicle body 4 and the second final assembly location 8 on the left side L of the vehicle body 4. At the first final assembly location 7, the right vehicle door 2 is assembled on the vehicle body 4 and on the second final assembly location 8, the left vehicle door 3.

Between the provisioning position 6 and the assembly locations 7, 8 a height offset of at least one meter, preferably of at least two meters, in particular of at least three meters and/or of maximally five meters is arranged.

The assembly station 1 includes a first and second robot device 9, 10 which is designed as six-axis jointed-arm robot.

The first robot device 9 is arranged on the right side R of the conveyor 11 and the second robot device 10 on the left side L.

The first robot device 9 grips the right vehicle door 2 in the provisioning position 6 and transports the same to the first final assembly location 7, while the second robot device 10 grips the left vehicle door 2 in the provisioning position 6 and transports the same to the second final assembly location 8. When necessary, the first and/or the second robot device 9, 10 adjusts the right and/or left vehicle door 2, 3 following the gripping and/or turns the same by for example 180 degrees in order to bring the same into a fitting assembly position. During the conveying of the vehicle doors 2, 3 to the corresponding final assembly locations 7, 8, the robot devices 9, 10 bridge the height offset that is arranged between the provisioning position 6 and the final assembly locations 7, 8.

Figure 2:
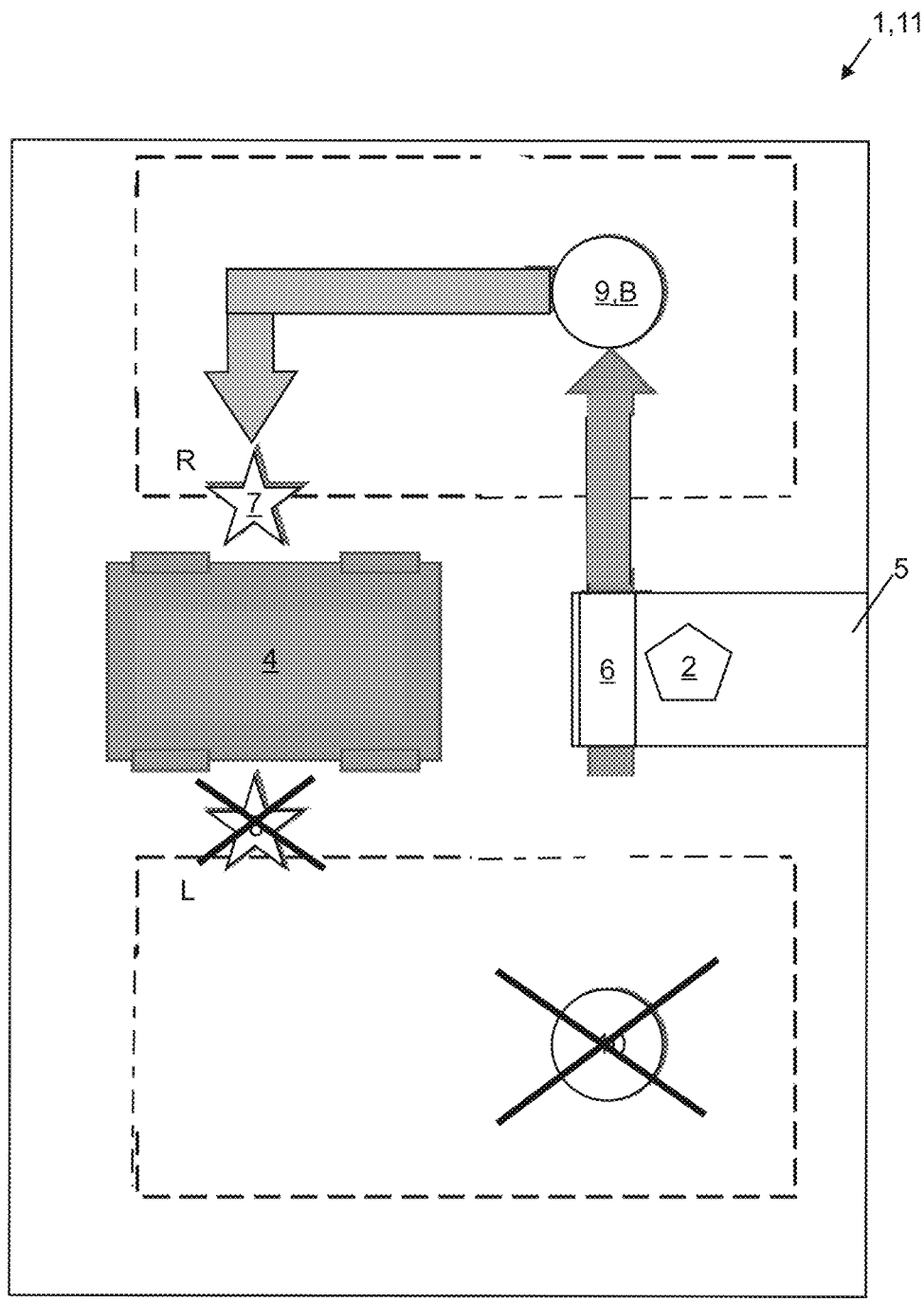
FIG. 2 shows the assembly station shown in FIG. 1, wherein the second robot device is defective and the first robot device grips the first vehicle component in the provisioning position and conveys the same to the first final assembly location on the vehicle body.

FIG. 2 shows the assembly station from FIG. 1, wherein the second robot device 10 is defective. Merely the first robot device 9 is functional. The first robot device 9 grips, as already described with respect to FIG. 2, the right vehicle door 2 in the provisioning position 6, bridges the height offset, adjusts the vehicle door 2 into the correct assembly position and transports the same to the first final assembly location 7 on the right side R adjacent to the vehicle body 4. There, the worker can fine-adjust and final-assemble the right vehicle door 2 on the vehicle body 4 with the help of the first robot device 9.

Figure 3:
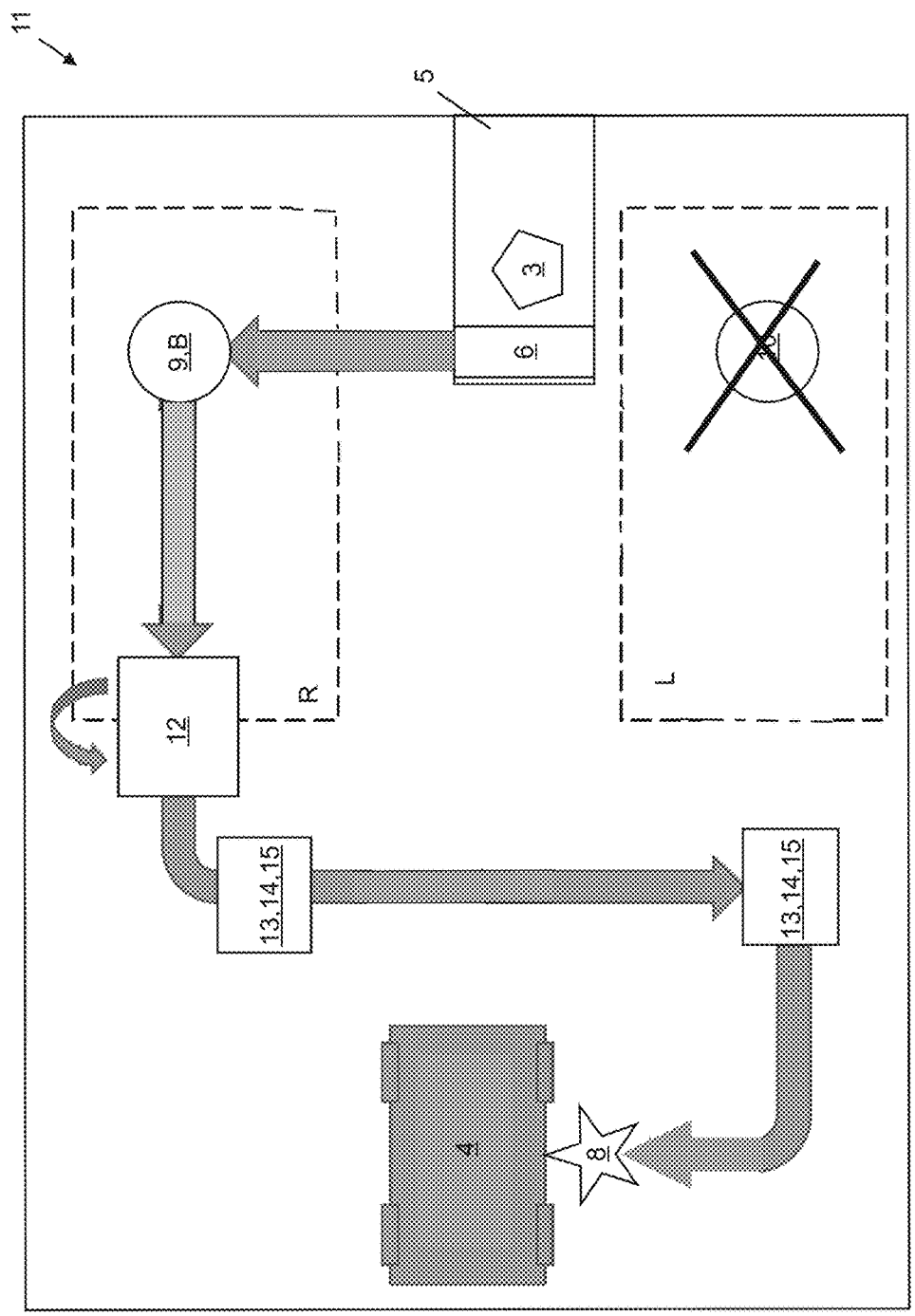
FIG. 3 shows the assembly station from FIG. 2, wherein the second robot device is defective and the assembly station is configured as a backup assembly station with a handover location such that the first robot device grips the second vehicle component in the provisioning position and conveys the same to the handover location.

Should the second robot device 10 be defective, a backup method intervenes, after the left vehicle door 3 is conveyed in the assembly station 1 to the vehicle body 4, in order to final-assemble the same there. The backup method is carried out in a backup assembly station 11 (FIG. 3). For this purpose, the assembly station 1 (FIG. 1) is converted to the backup assembly station 11. In particular, the assembly station 1 is supplemented by a handover location 12 and with at least one auxiliary device.

Both robot devices 9, 10 are programmed to two different operating modes, of which a first operation mode A is a standard operating mode for carrying out the method described in FIG. 1. A second operating mode B is a backup operating mode B in which the relevant robot device 9, 10 carries out the backup method.

Since the second robot device 10 is defective, the first robot device 9 is switched over to the backup operating mode B within the scope of the backup method. Alternatively, in the event that the first robot device 9 is defective, the second robot device 10 can be switched over to the backup operating mode B.

FIG. 3 shows the backup assembly station 1 in a schematic top view from above in which the backup method is carried out with the first robot device 9 in the backup operating mode B. The assembly station 1 is converted into the backup assembly station 12 and includes the handover location 12 and the at least one auxiliary device 13. The at least one auxiliary device 13 is designed as a transport device 14 and as a lifting and/or handling device 15.

Within the scope of the backup method, the first robot device 9 in the backup operating mode B grips the left vehicle door 3 in the provisioning position 6 since the second robot device 10 is defective. The first robot device 9 conveys the left vehicle door 3 in the backup operating mode B to the handover location 12. The same is designed as a turntable on which the left vehicle door 3 placed thereon is turned by for example 180 degrees and thereby adjusted for the correct assembly position. Alternatively, the first robot device 9 can suitably adjust and/or turn the left vehicle door 3 and put the same down at the handover location 12 in the correct assembly position.

The worker takes over the left vehicle door 3 at the handover location 12 with the help of the lifting and/or handling device 14 and loads the same onto the transport device 15, which is designed for example as a so-called dolly. The worker transports the left vehicle door 3 with the transport device 15 to the second final assembly location 8 where he fine adjusts and final-assembles the left vehicle door 3 with the help of the lifting and/or handling device 14.

Once the first robot device 8 has put down the left vehicle door 3 at the handover location 12, it grips the right vehicle door 2 and conveys the same, as already described in FIG. 2, to the first final assembly location 7.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method for conveying a first vehicle component and a second vehicle component to a vehicle body comprising:
  providing the first vehicle component in a provisioning position of an assembly station,
  the provisioning position defined by a suspended conveyor;
  positioning the vehicle body in a final assembly location of the assembly station,
  with a height offset defined between the provisioning position and the final assembly location;
  gripping the first vehicle component with a first robot device in the provisioning position;
  conveying the first vehicle component with the first robot device from the provisioning position to a first side of the vehicle body in the final assembly location, the first robot device bridging the height offset during the conveying of the first vehicle component;
  providing the second vehicle component in the provisioning position;
  detecting a defect condition for a second robot;
  based on the detection of the defect condition:
  gripping the second vehicle component with the first robot device in the provisioning position;
  conveying the second vehicle component with the first robot device from the provisioning position to a handover location on the first side of the vehicle body in the final assembly location,
  the first robot device bridging the height offset during the conveying of the second vehicle component to the handover location;
  handing over the second vehicle component to an auxiliary device to convey the second vehicle component from the handover position to a correct assembly position on a second side of the vehicle body in the final assembly location; and assembling the second vehicle component to the vehicle body.

2. The method according to claim 1, further comprising assembling the first vehicle component on the vehicle body.

3. The method according to claim 2, further comprising aligning the first vehicle component relative to the vehicle body with the first robot device for the final assembly.

4. The method according to claim 1, further comprising switching the first robot device over to a backup operating mode based on the detection of the defect condition of the second robot.

5. The method according to claim 1, wherein a second height offset is defined between the provisioning position and the handover location, and the conveying the second vehicle component with the first robot device from the provisioning position to the handover location on the first side of the vehicle body includes the first robot device bridging the first height offset and the second height offset during the conveying of the second vehicle component to the handover location.

6. A method for conveying vehicle components to a vehicle body comprising:

provide a first vehicle door in a provisioning position of an assembly station, the provisioning position defined by a suspended conveyor;

positioning the vehicle body in a final assembly location of the assembly station, with a height offset defined between the provisioning position and the final assembly location;

gripping the first vehicle door with a first robot device in the provisioning position;

conveying the first vehicle door with the first robot device from the provisioning position to a first side of the vehicle body in the final assembly location, the first robot device bridging the height offset during the conveying of the first vehicle door;

assembling the first vehicle door to the vehicle body;

providing a second vehicle door in the provisioning position;

detecting a defect condition for a second robot; and based on the detection of the defect condition:

gripping the second vehicle door with the first robot device in the provisioning position;

conveying the second vehicle door with the first robot device from the provisioning position to a handover location arranged between the provisioning position and the final assembly location on the first side of the vehicle body, with a second height offset defined between the provisioning position and the handover location, the first robot device bridging the first height offset and the second height offset during the conveying of the second vehicle door to the handover location;

handing over the second vehicle door to an auxiliary device to convey the second vehicle door from the handover position to a correct assembly position on the second side of the vehicle body in the final assembly location; and assembling the second vehicle door to the vehicle body.

7. The method according to claim 6, wherein the handover location is a turntable and the method further comprises transposing the second vehicle component on a turntable into the correct assembly position.

* * * * *